US006868928B2

(12) United States Patent
Cohen et al.

(10) Patent No.: US 6,868,928 B2
(45) Date of Patent: Mar. 22, 2005

(54) FLUID CENTER

(75) Inventors: Samuel L. Cohen, Fort Wayne, IN (US); Brian Jacquay, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 95 days.

(21) Appl. No.: 10/305,313

(22) Filed: Nov. 26, 2002

(65) Prior Publication Data

US 2004/0099456 A1 May 27, 2004

(51) Int. Cl.⁷ .............................................. B60K 13/02
(52) U.S. Cl. ..................... 180/68.3; 296/192; 296/208
(58) Field of Search ........................... 296/192, 193.01, 296/193.03, 193.04, 193.09, 193.1, 208; 180/68.3

(56) References Cited

U.S. PATENT DOCUMENTS

| | | | | |
|---|---|---|---|---|
| 4,689,060 A | * | 8/1987 | Koske ........................ 55/385.3 |
| 4,893,865 A | * | 1/1990 | McClain et al. ............. 296/192 |
| 5,042,603 A | * | 8/1991 | Olson ......................... 180/68.3 |
| 5,082,078 A | * | 1/1992 | Umeda et al. ................ 180/90 |
| 5,230,547 A | * | 7/1993 | Koukal et al. .............. 296/192 |
| 5,561,882 A | * | 10/1996 | Eustache et al. ....... 15/250.001 |
| 6,514,136 B1 | * | 2/2003 | Hanaya et al. .............. 454/147 |
| 2003/0025351 A1 | * | 2/2003 | Graf et al. .................. 296/108 |

FOREIGN PATENT DOCUMENTS

| | | | |
|---|---|---|---|
| FR | 2623455 | * | 5/1989 |
| JP | 2-144282 | * | 6/1990 |
| JP | 4-87887 | * | 3/1992 |

* cited by examiner

Primary Examiner—Bryan Fischmann
(74) Attorney, Agent, or Firm—Jeffrey P. Calfa; Dennis Kelly Sullivan; Susan L. Lukasik

(57) ABSTRACT

A vehicle has a fluid center that comprises a cowl tray mounted to the cowl structure of its operator cabin below a lower end of the windshield of the operator cabin. In addition to a cowl tray the fluid center comprises a fluid reservoir and/or a fluid-center-mounted engine-air-intake duct with an inlet that is directly or indirectly in fluid communication the atmosphere and an outlet that is in fluid communication with other engine-air-intake ducts of the vehicle.

18 Claims, 11 Drawing Sheets

FLUID CENTER

BACKGROUND OF THE INVENTION

The present invention relates to vehicles with assemblies for catching moisture and debris that are mounted to a forward portion of an operator cabin below a windshield of the operator cabin.

DRAWINGS

Other objects and advantages of the invention will become more apparent upon perusal of the detailed description thereof and upon inspection of the drawings in which.

DETAILS OF THE INVENTION

Figure 1:
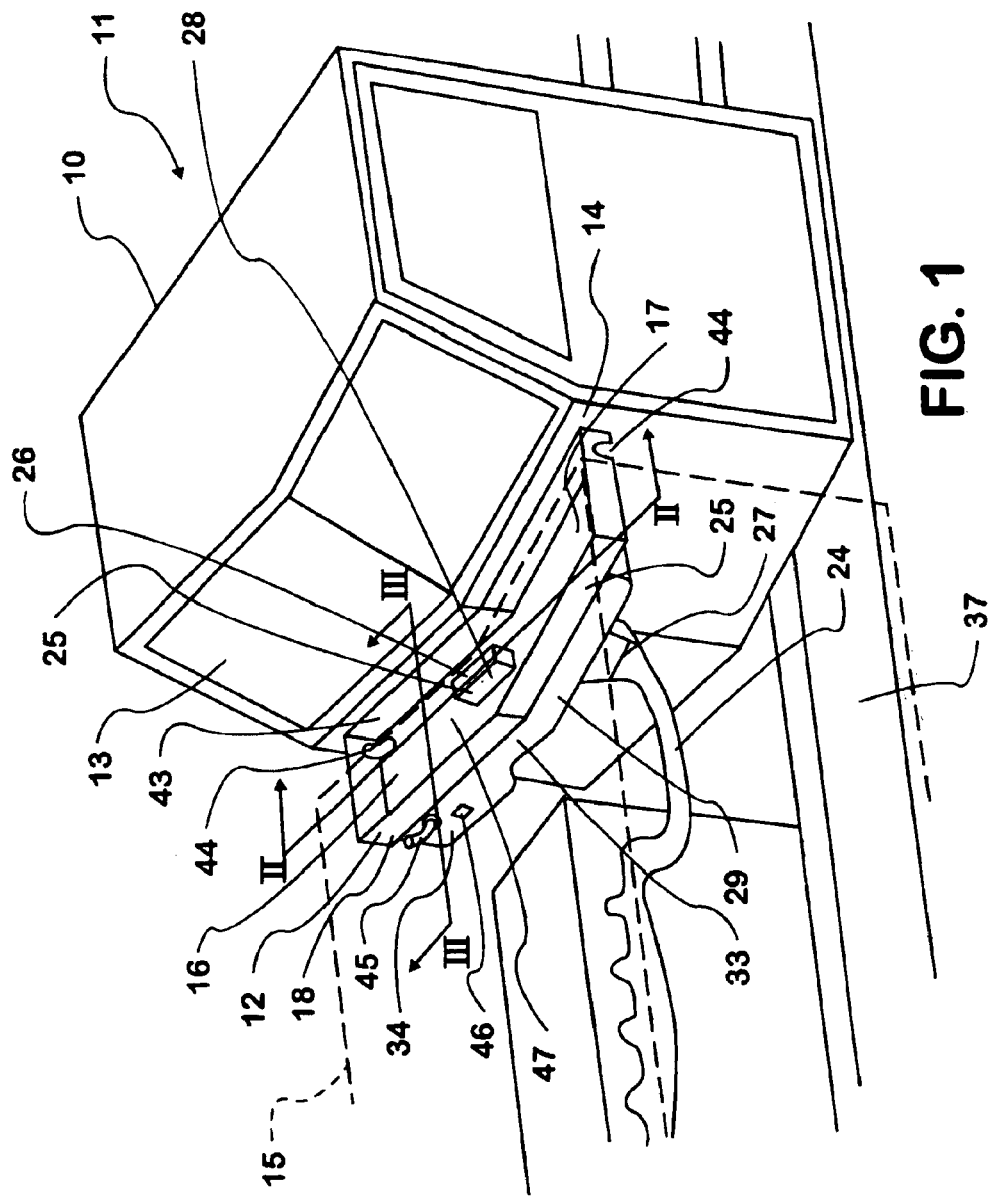
FIG. 1 is a perspective view of a vehicle according to the present invention with a fluid center that comprises both a fluid-center-mounted engine-air-intake duct and a fluid-reservoir basket that are part of a fluid-center understructure and with the engine compartment hood shown in phantom.
Figure 2:
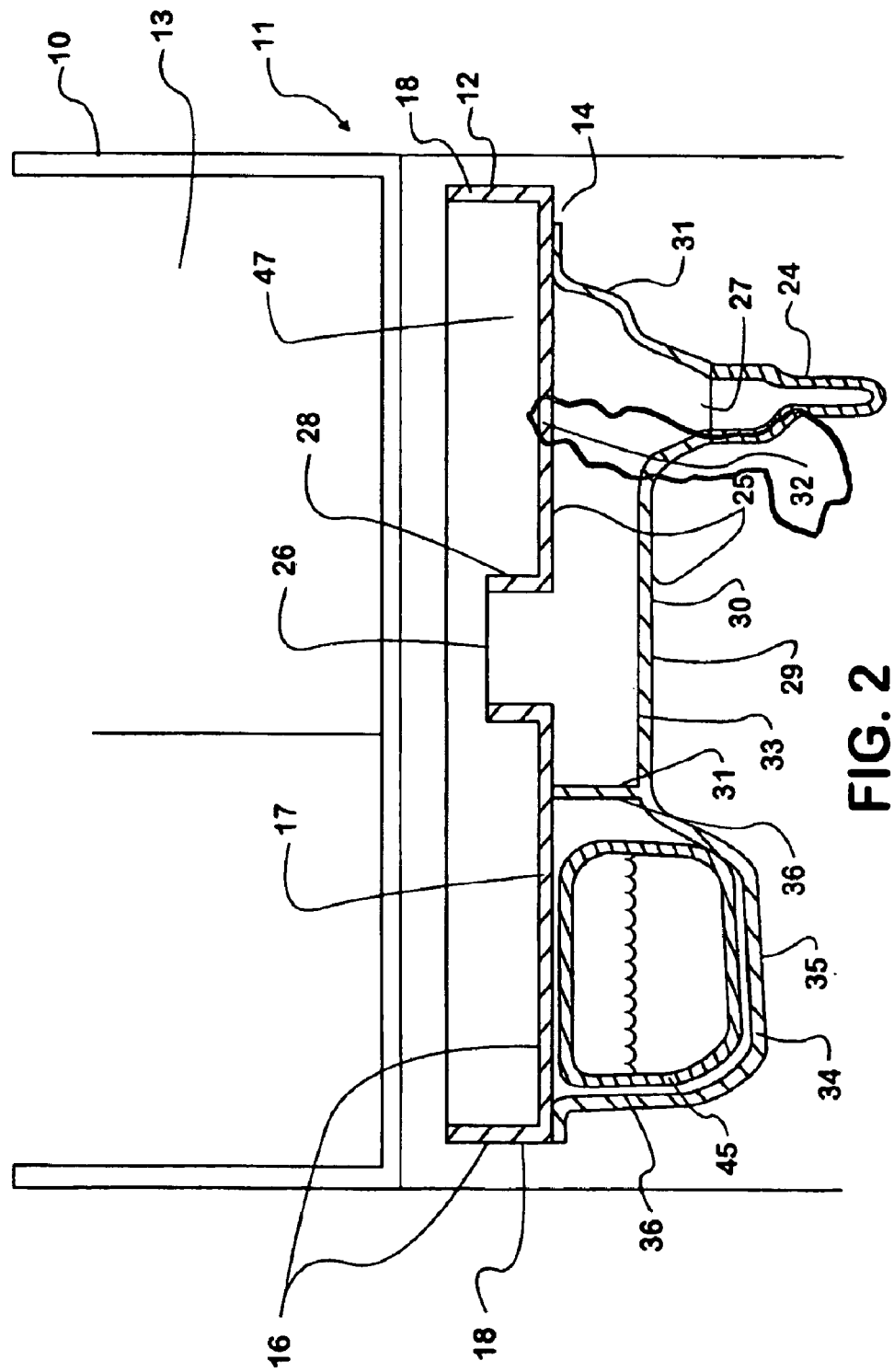
FIG. 2 is a sectional view through line II—II of FIG. 1 showing the fluid-center understructure which comprises a duct shell and a fluid reservoir basket.
Figure 3:
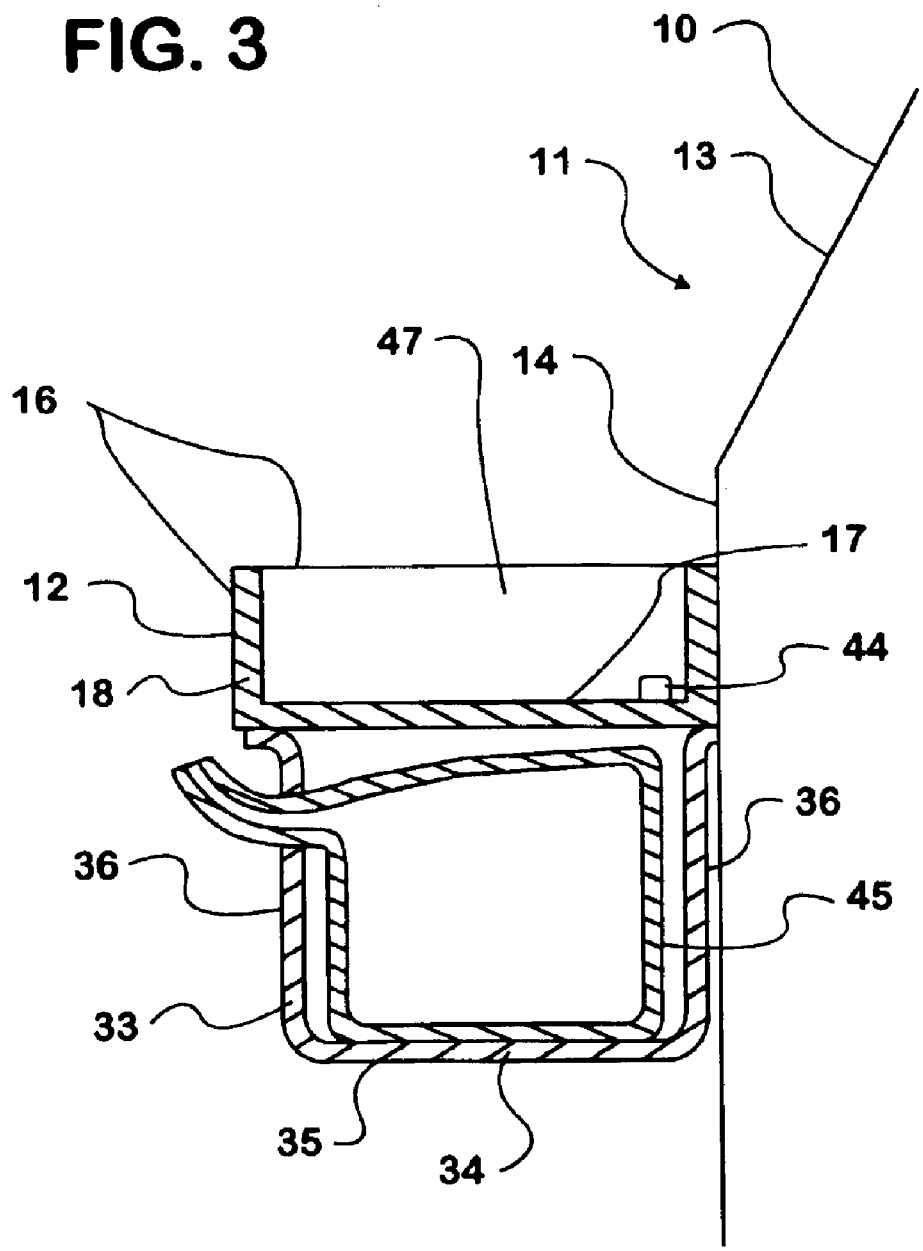
FIG. 3 is a sectional view through line II—II of FIG. 1 showing the details of the fluid-reservoir basket of the fluid center.
Figure 4:
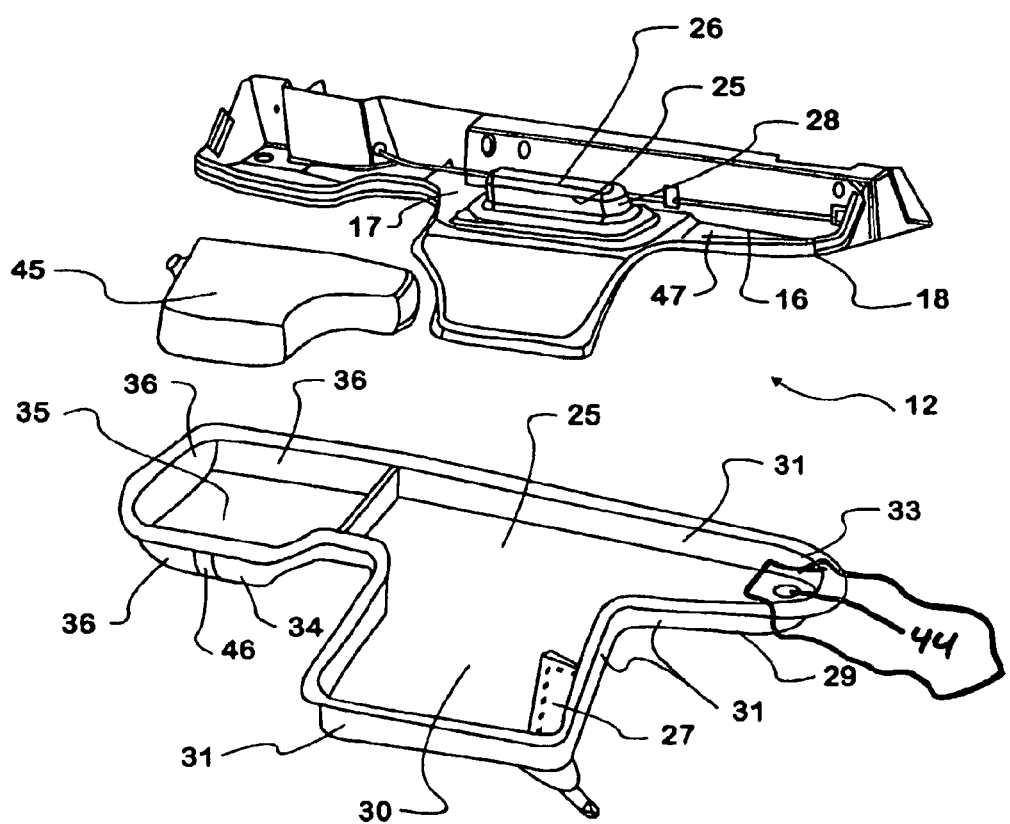
FIG. 4 is a an exploded view of a fluid center assembly very similar to the fluid center shown in FIGS. 1–3 in that it comprises a fluid-center understructure with a duct shell and a fluid reservoir basket.
Figure 5:
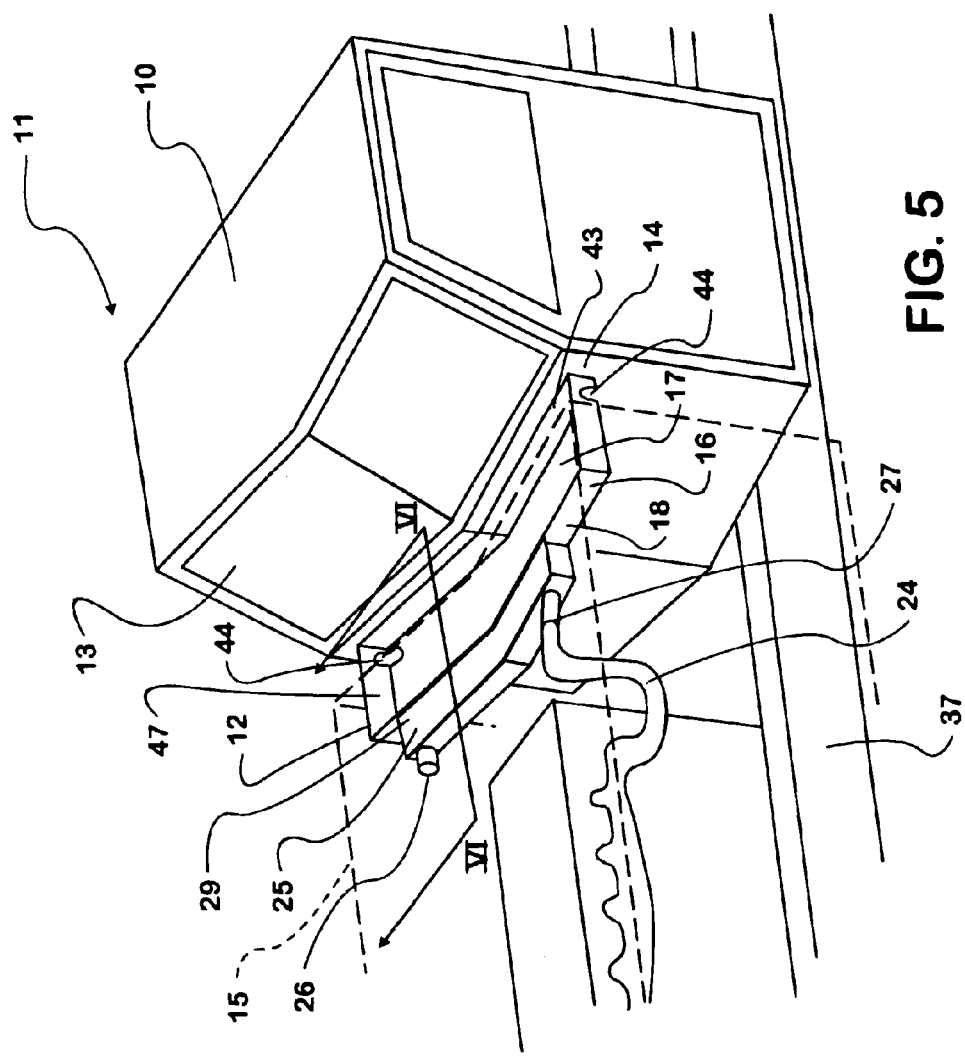
FIG. 5 is a perspective view of a vehicle according to the present invention with a fluid center that comprises a fluid-center-mounted engine-air-intake duct that comprises a duct shell that cooperates with the tray wall of the cowl tray to form a portion of the interior passage of the fluid-center-mounted engine-air-intake duct and with the vehicle's engine-compartment hood shown in phantom.
Figure 6:
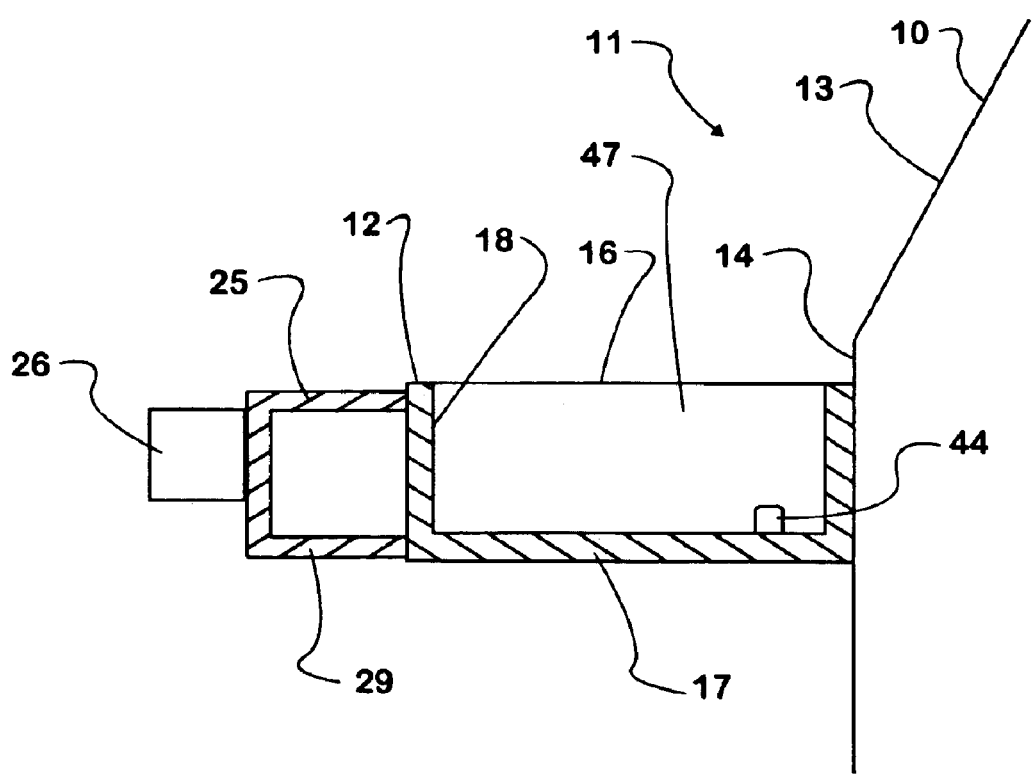
FIG. 6 is a section view through line VI—VI of FIG. 5 showing a portion of the interior passage of the fluid-center-mounted engine-air-intake duct that is defined by the duct shell and the tray wall of the cowl tray in concert.
Figure 7:
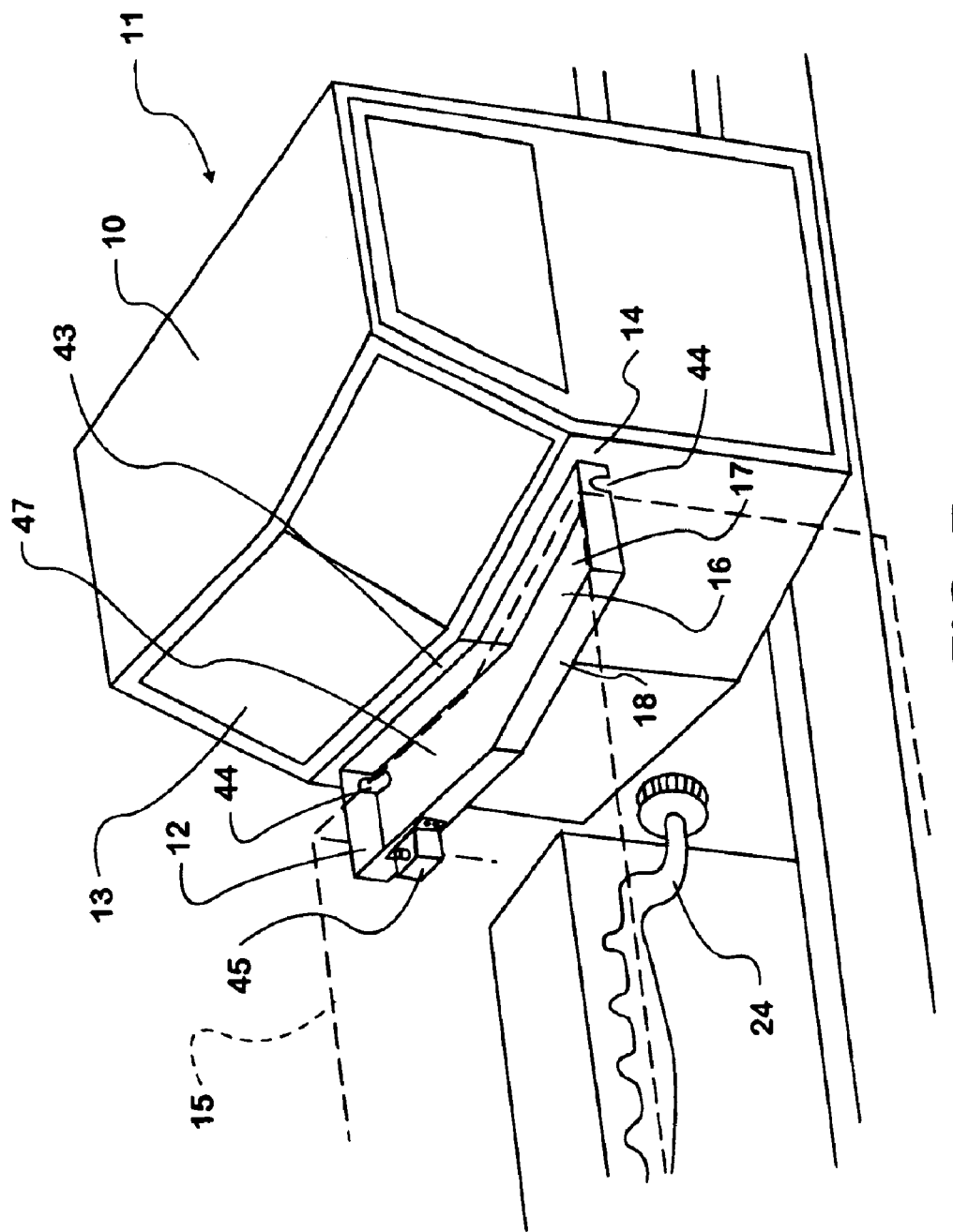
FIG. 7 is a perspective view of a vehicle according to the present invention with a fluid center that comprises a fluid reservoir mounted to the tray wall of the cowl tray of the fluid center with the engine compartment hood shown in phantom.
Figure 8:
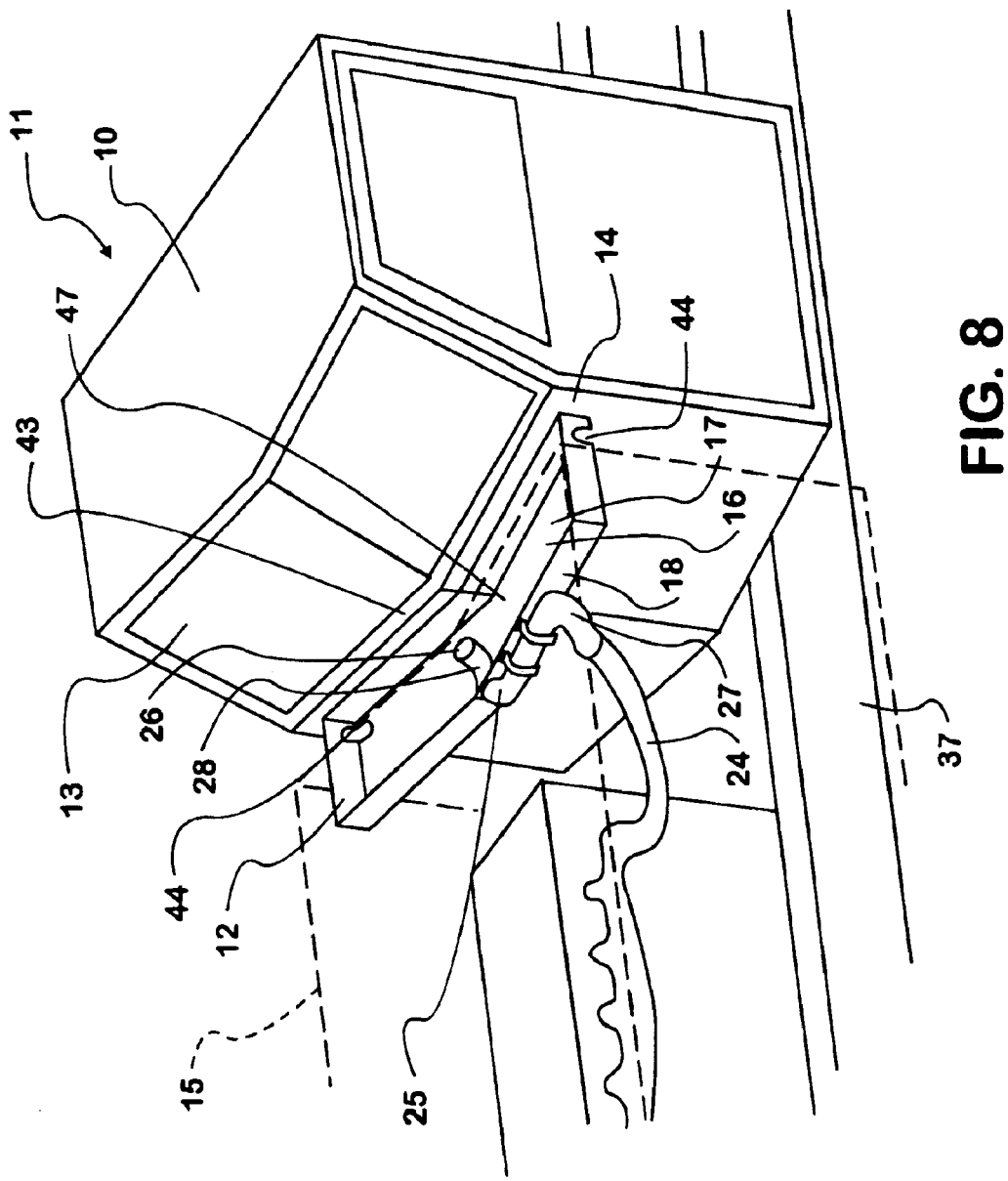
FIG. 8 is a perspective view of a vehicle according to the present invention with a fluid center that comprises a fluid-center-mounted engine-air-intake duct that is strapped to the tray wall of the cowl tray of the fluid center with the engine compartment hood shown in phantom.
Figure 9:
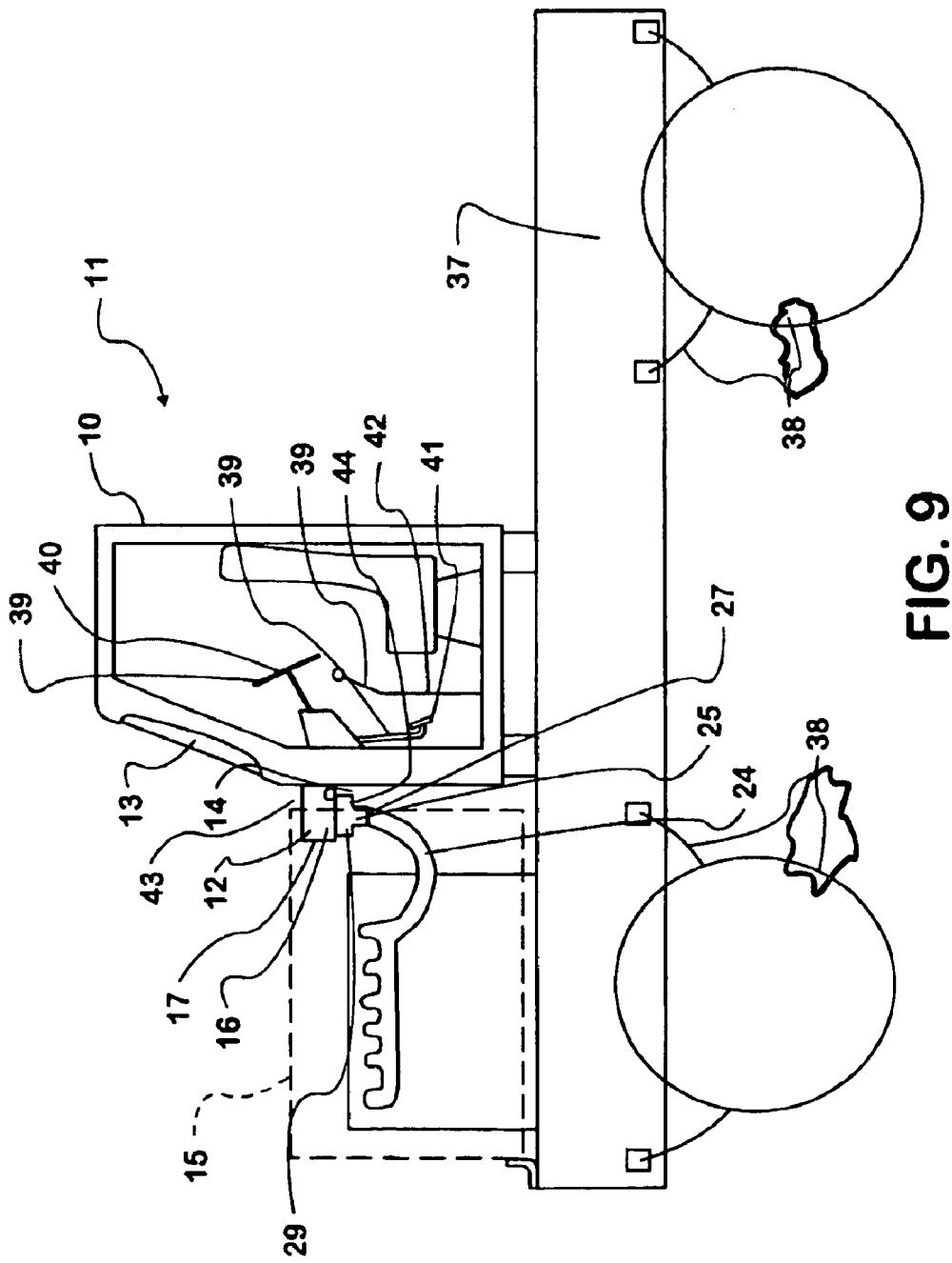
FIG. 9 is a elevation of a vehicle with a very similar construction to that of the one shown in FIG. 1 with the engine-compartment hood of the vehicle shown in phantom.
Figure 10:
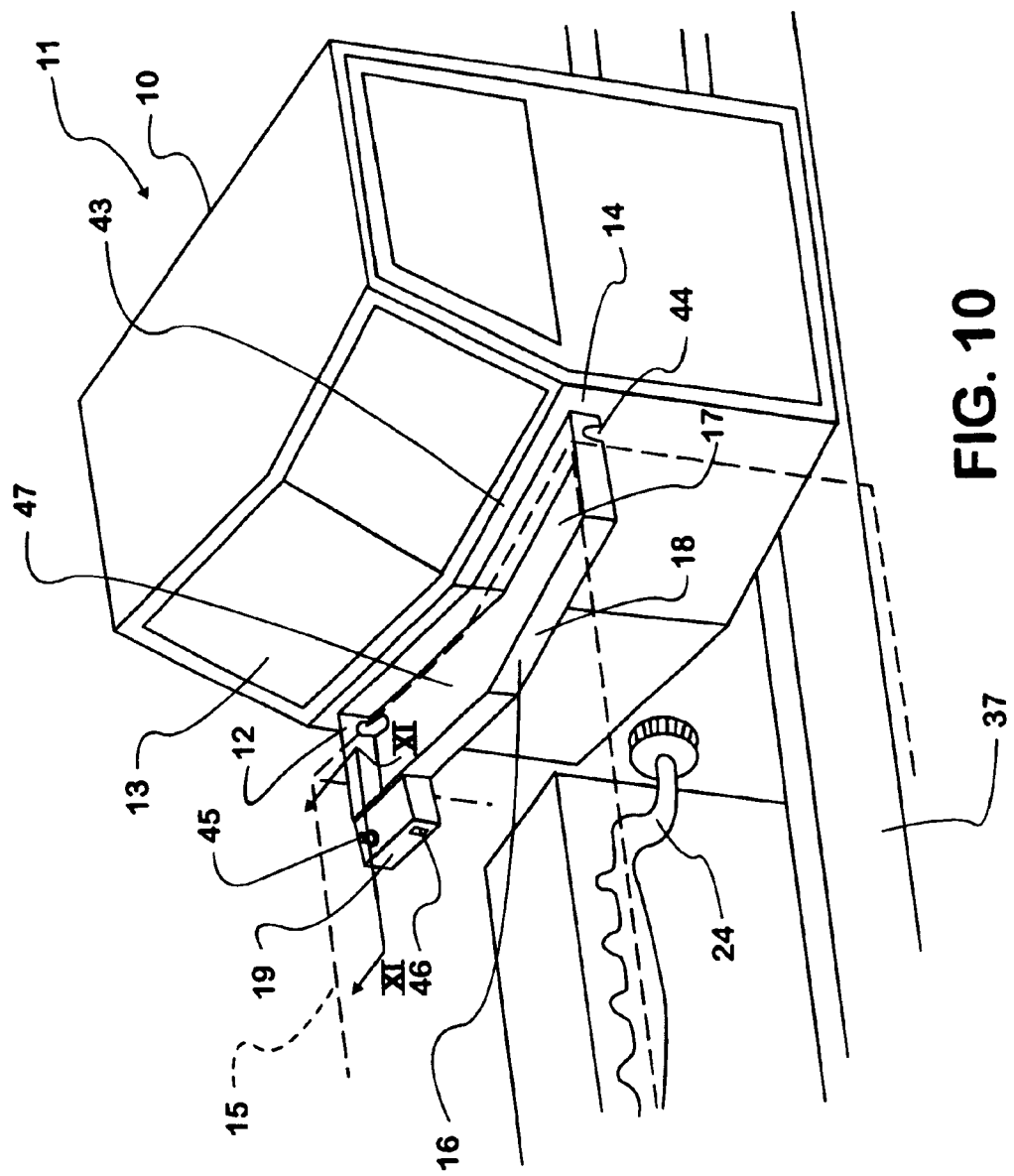
FIG. 10 is a perspective view of a vehicle according to the present invention with a fluid center that comprises a fluid reservoir that is attached to the fluid center by reservoir-mounting structure that has opposing portions on opposite sides of the fluid reservoir and that is integrally formed with the tray wall of the cowl tray with the engine compartment hood shown in phantom.
Figure 11:
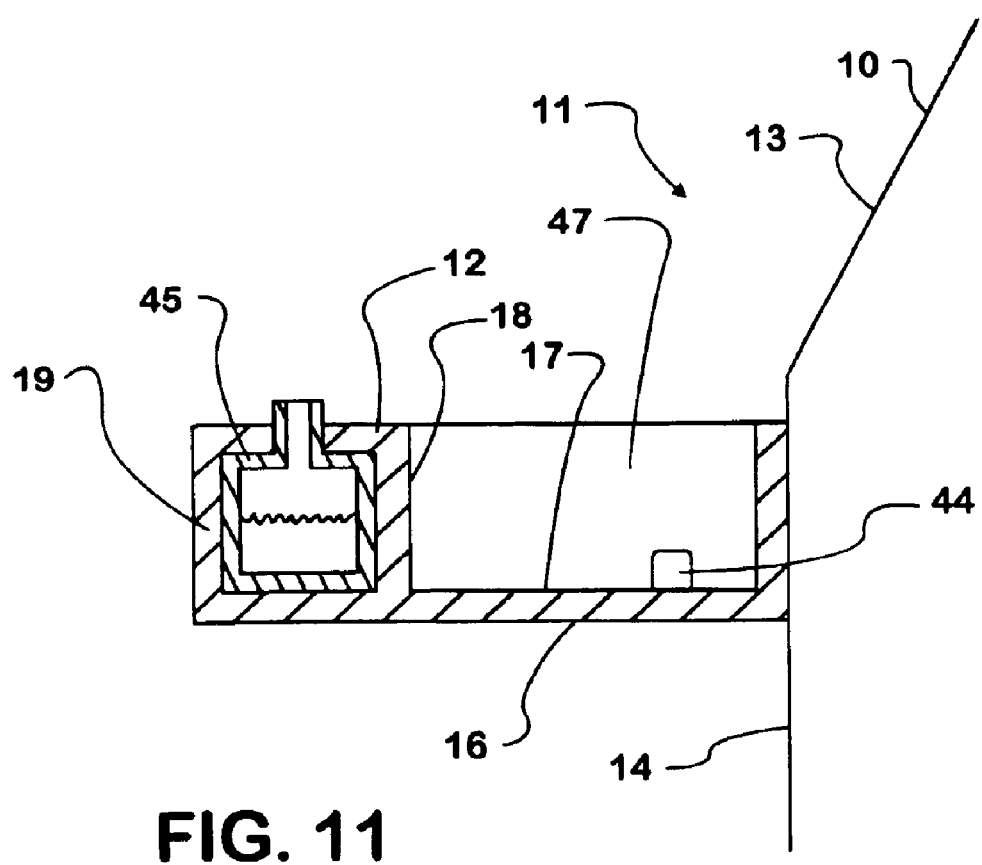
FIG. 11 is a sectional view through line XI—XI of FIG. 10.

Embodiments of the present invention and subcomponents thereof are illustrated in FIGS. 1–11. Embodiments of the present invention comprise a vehicle 11. A vehicle 11 according to the present invention comprises one or more rigid frame structures 37 to which a majority of other components of the vehicle 11 are engaged directly or indirectly and from which those components derive support directly or indirectly. A vehicle 11 according to the present invention further comprises a suspension system 38 that is engaged to and supports the one or more frame structures 37 of the vehicle 11 above the ground. The suspension system 38 of the vehicle 11 is further constructed to give the vehicle 11 a relatively low resistance to movement along the ground. A vehicle 11 according to the present invention further comprises an operator cabin 10 within which an operator of the vehicle 11 may reside while operating the vehicle 11. A vehicle 11 also comprises vehicle controls 39 that are mounted within the operator cabin 10 in such a position that an operator of the vehicle 11 may manipulate them from within the operator cabin 10. Vehicle controls 39 that a vehicle 11 according to the present invention may comprise include but are not limited to steering wheels 40, control pedals 41, and gear-shift levers 42. The operator cabin 10 has on an upper forward side a windshield 13 through which an operator of the vehicle 11 may view terrain in front of the vehicle 11. An operator cabin 10 of a vehicle 11 according to the present invention further comprises cowl structure 14 that is disposed at a forward side of the operator cabin 10 at a level below the windshield 13 of the operator cabin 10. A vehicle 11 according to the present invention further comprises an engine-compartment hood 15 that is disposed forward of and directly adjacent the operator cabin 10 of the vehicle 11 and that covers an engine compartment of the vehicle 11. A gap 43 exists between an upper rear portion of the engine-compartment hood 15 and the cowl structure 14 of the operator cabin 10.

A vehicle 11 according to the present invention has a fluid center 12 that is mounted to a portion of the cowl structure 14 adjacent the gap 43 between the upper rear portion of the engine-compartment hood 15 and the cowl structure 13. The fluid center 12 comprises a cowl tray 16 that catches liquid and debris that falls through the gap 43 between the upper rear portion of the engine-compartment hood 15 and the cowl structure 14. The cowl tray 16 comprises a tray floor 17 that extends horizontally below the gap 43 between the upper rear portion of the engine-compartment hood 15 and the cowl structure 14 of the operator cabin 10. The cowl tray 16 also comprises a tray wall 18 that extends vertically upward from at least a portion of the tray floor 17 that is disposed opposite the cowl structure 14 of the vehicle 11. A catch basin 47 is, thus defined above the tray floor 17 of the cowl tray 16 of a fluid center 12 according to the present invention. The tray floor 17 and/or the tray wall 18 of the cowl tray 16 define one or more drain holes 44 through which liquid that has fallen into the cowl tray 16 may exit. Such a construction and positioning of the cowl tray 16 of the fluid center 12 of a vehicle 11 according to the present invention ensures that liquid that falls through the gap 43 between the upper rear portion of the engine-compartment hood 15 and the cowl structure 14 will fall from the carefully chosen locations of the drain holes 44 of the cowl tray 16 instead of falling randomly down the cowl structure 14 and components mounted thereto.

In some embodiments of the present invention, such as those shown in FIGS. 1, 2, 3, 4, 7, 10, and 11, the fluid center 12 mounted to the cowl structure 14 of an operator cabin 10 comprises a fluid reservoir 45. The fluid reservoir 45 of such embodiments of fluid centers 12 according to the present invention may be mounted to the fluid center 12 in any of an innumerable variety of ways. In some embodiments of the present invention, such as the one shown in FIG. 7, fasteners, adhesives, and/or brackets may be utilized to mount a fluid reservoir 45 to the fluid center 12 of a vehicle 11. In some embodiments of the present invention, such as those illustrated in FIGS. 1, 2, 3, 4, 10, and 11, mounting of a fluid reservoir 45 to a fluid center 12 is accomplished at least in part through sandwiching of at least a portion of the fluid reservoir 45 between other components and/or structures of the fluid center 12. In some such embodiments, such as those shown in FIGS. 10 and 11, one or more portions of a fluid reservoir 45 are captured between opposing portions of reservoir-mounting structure 19 that is integrally formed with some other part of the fluid center 12. Such embodiments of a fluid center 12 according to the present invention could be made by placing a fluid reservoir 45 in a mold and then simultaneously molding the reservoir-mounting structure 19 around the fluid reservoir 45 and some other part of the fluid center 12 which will, accordingly, be considered to be integrally formed with the reservoir-mounting structure 19. There are many different types of materials and molding or casting processes that could be advantageously used to construct a fluid center 12 in such a manner. In some embodiments of the present invention that are constructed in such a manner, the fluid reservoir 45 would be blow molded out of nylon and placed in a mold in which the reservoir-mounting structure 19 and the other portion of the fluid center 12 that it is integrally formed with would be injection molded out of talc filled polypropylene. Of course, any combination of materials and processes that allows the fluid reservoir 45 to be constructed and then placed into a mold within which simultaneous molding or casting of reservoir-mounting structure 19 around the fluid reservoir 45 and molding or casting of another portion of the fluid center 12 integral with the fluid-mounting structure 19 is executed may be utilized to construct embodiments of the present invention that comprise reservoir-mounting structure 19 that has opposing portions between which portions of the fluid reservoir 45 are captured and that is integrally formed with another part of the fluid center 12. Such a method of construction may be utilized to make embodiments of the present invention that have reservoir-mounting structure 19 that is integrally formed with virtually any other part of a fluid center 12 of a vehicle 11. In some embodiments of the present invention a fluid center 12 includes reservoir-mounting structure 19 that has opposing portions between which at least a portion of the fluid reservoir 45 is captured and that is integrally formed with the cowl tray 16 of the fluid center 12.

In some embodiments of the present invention in which a fluid center 12 comprises a fluid reservoir 45, the fluid center 12 and the fluid reservoir 45 thereof are constructed in such a manner to facilitate easy determination of the level of fluid contained in the fluid reservoir 45. In some embodiments of the present invention the fluid reservoir 45 has at least a portion that is constructed of a translucent or transparent material through which an individual may look to see the level of any fluid that is contained within the fluid reservoir 45. Of course, in order for it to be possible for an individual to look through a translucent or transparent portion of a fluid reservoir 45 there must be at least a portion of that translucent or transparent portion of the fluid reservoir that is not covered by other structure of the fluid center 12 so that it is exposed and an individual can, therefore, look through it. In some embodiments of the present invention, such as those shown in FIGS. 1, 2, 3, 4, 10 and 11, a fluid center 12 is constructed with structure that, for reasons related to considerations other than the ability to determine the fluid level in the fluid reservoir, surrounds the vast majority of a fluid reservoir 45 but defines a view window 46 through which an individual may look through an adjacent translucent or transparent portion of the fluid reservoir 45 in order to determine the level of fluid in the fluid reservoir 45.

A fluid reservoir 45 of a fluid center 12 according to the present invention may be utilized to store fluid for any of a number of different types of systems of the vehicle 11. In some embodiments of the present invention a vehicle 11 comprises a windshield-washing system (not shown) that is operable to spray windshield-washer fluid onto the windshield 13 in order to facilitate cleaning dirt off of the windshield 13. In some embodiments of the present invention a fluid reservoir 45 of a fluid center 12 is utilized to store windshield-washer fluid for use by such a windshield-washing system. In such embodiments of the present invention the interior of the fluid reservoir 45 of the fluid center 12 is in fluid communication with a windshield-washer pump that is operable to pump windshield-washer fluid from the fluid reservoir 45 to windshield-washer nozzles and from whence it is sprayed onto the windshield. Utilization of a fluid reservoir 45 of a fluid center 12 mounted to the cowl structure 14 of a vehicle 11 to store windshield-washer fluid for use by a windshield-washing system of the vehicle 11 is space and cost efficient because the fluid reservoir is located in close proximity to the final destination of the windshield-washer fluid—the windshield 13. Of course it will be understood that a fluid center 12 according to the present invention may comprise more than one fluid reservoir 45.

In some embodiments of the present invention, such as those shown in FIGS. 1, 2, 3, 4, 5, 6, 8, and 9, a fluid center 12 of a vehicle 11 comprises a fluid-center-mounted engine-air-intake duct 25 that has an inlet 26 that is directly or indirectly in fluid communication with the atmosphere and an outlet 27 that is in fluid communication with other engine-air-intake ducts 24 of the vehicle 11. This is illustrated in a comparison between FIGS. 1 and 5, where there is an opening for under hood air intake just above outlet 27 and there is no such under hood air intake shown in FIG. 1. A fluid-center-mounted engine-air-intake duct 25 of a fluid center 12 according to the present invention may be constructed and engaged to the other components and structures of the fluid center 12 in any of a number of ways. In some embodiments of the present invention, such as those shown in FIGS. 1, 2, 3, 4, 5, and 6, a fluid-center-mounted engine-air-intake duct 25 comprises a duct shell 29 that is attached to the other components of the fluid center 12 in such a manner that at least a portion the peripheral edge of the duct shell 29 is abutted against outer portions of the tray wall 18 and/or the tray floor 17 in such a manner that the duct shell 29 acts in concert with portions of the tray wall 18 and/or the tray floor 17 to define at least a portion of an interior passage of the fluid-center-mounted engine-air-intake duct 25 between the duct shell 29 and the outer portions of the tray wall 18 and/or the tray floor 17. Such a design of a fluid-center-mounted engine-air-intake duct 25 is well adapted for construction entirely from components that have an open-shape construction. A component that has an open-shape construction is of such a shape that there exists at least one direction in which a line passing through any portion of the component will intersect its outer surfaces at only two places. A component that has such an open-shape construction can be constructed relatively economically by molding it between two halves of a mold and subsequently separating the two halves of the mold from one other to allow removal of the component from the mold. A duct shell 29 adapted to be engaged to other components of a fluid center 12 in such a manner to act in concert with the tray wall 18 and/or the tray floor 17 to define at least a portion of an interior passage of the fluid-center-mounted engine-air-intake duct 25 may readily be built with an open-shape construction. Additionally, the cowl tray 16 that such a duct shell 29 is attached to and any structures integrally formed with the cowl tray 16 may be readily built with an open-shape construction.

The inlet 26 of a fluid-center-mounted engine-air-intake duct 25 according to the present invention may be located virtually anywhere that it can be placed directly or indirectly in fluid communication with the atmosphere. In some embodiments of the present invention, such as those shown in FIGS. 1, 2, 3, 4, and 8, the inlet 26 of a fluid-center-mounted engine-air-intake duct 25 according to the present invention is disposed within and/or above the catch basin 47 that is defined above the tray floor 17 of the cowl tray 16. Such a positioning of the inlet 26 of the fluid-center-mounted engine-air-intake duct 25 is advantageous because it allows fresh air to travel from the region above the gap 43 between the upper rear portion of the engine-compartment hood 15, through the gap 43 and into the inlet 26 of the fluid-center-mounted engine-air-intake duct 25. When a vehicle 11 with such a positioning of the inlet 26 of fluid-center-mounted engine-air-intake duct 25 moves forward at significant speeds, air travels at an accelerated rate from a high pressure region adjacent the lower end of the windshield 13 through the gap 43 between the upper rear portion of the engine-compartment hood 15 and into the inlet 26 of the fluid-center-mounted engine-air-intake duct 25. In some embodiments of the present invention, such as those shown in FIGS. 1, 2, 3, 4, and 8, in which the inlet 26 of a fluid-center-mounted engine-air-intake duct 25 is positioned within or above the catch basin 47 defined by the cowl tray 16, the fluid-center-mounted engine-air-intake duct 25 comprises an intake projection 28 that extends from the tray wall 18 and/or the tray floor 17 into the catch basin 47 defined thereby. In such embodiments of the present invention the intake projection 28 has walls that surround an opening in the tray wall 18 and/or the tray floor 17 at their point of engagement to the tray wall 18 and/or the tray floor 17. The walls of such an intake projection 28 of a fluid-center-mounted engine-air-intake duct 25 define the inlet 26 between their ends distal from their point of engagement to the tray wall 18 and/or the tray floor 17. Construction of a fluid-center-mounted engine-air-intake duct 25 with such an intake projection 28 advantageously significantly reduces the probability of moisture traveling from the catch basin 47 defined by the cowl tray 16 into the inlet 26 of the fluid-center-mounted engine-air-intake duct 25.

In some embodiments of the present invention a fluid-center-mounted engine-air-intake duct 25 comprises a duct shell 29 that is disposed below and is engaged to an underside of a the tray floor 17 of the cowl tray 16 of a fluid center 12. As can be seen in FIGS. 1, 2, 3, and 4, in some such constructions of the present invention the duct shell 29 comprises a duct floor 30 that extends horizontally at a level below the tray floor 17 of the cowl tray 16. In such embodiments of the present invention the duct shell 29 further comprises duct walls 31 that extend upwardly from the duct floor 30 to their point of engagement to the underside of the tray floor 17 of the cowl tray 16. In such embodiments of the present invention, placement of duct shell 29 below the tray floor 17 of a cowl tray 16 is a relatively space-efficient manner of packaging the components of the vehicle 11. Additionally, in such embodiments of the present invention, as a result of being engaged to an underside of the tray floor 17 of the cowl tray 16, the duct shell 29 serves to strengthen the cowl tray 16 in vertical directions.

In some embodiments of the present invention a duct shell 29 that is disposed beneath and engaged to an underside of a tray floor 17 of a cowl tray 16 is part of a fluid-center understructure 33 that is mounted to an underside of the cowl tray 16. In some such embodiments of the present invention, such as those shown in FIGS. 1, 2, 3, and 4, the fluid-center understructure 33 also comprises a reservoir basket 34 that supports a fluid reservoir 45 beneath a portion of the tray floor 17 of the cowl tray 16. A site glass 46 for external viewing of fluid level within the fluid reservoir 45 may be provided. A reservoir basket 34 of a fluid-center under structure 33 comprises a basket floor 35 that is disposed at a distance below the underside of the tray floor 17 of the cowl tray 16. A fluid reservoir 45 rests upon the basket floor 35 of the fluid-reservoir basket 34. One or more basket suspenders 35 extend upwardly from the basket floor 35 to their point of engagement with the underside of the tray floor 17 of the cowl tray 16. The basket suspenders 36 of such a reservoir basket 34 may be constructed substantially as a vertically extending wall such as is shown in FIGS. 1, 2, 3, and 4. Alternatively, the basket suspenders 36 of such a reservoir basket 34 may be considerably less extensive than those shown in FIGS. 1, 2, 3, and 4. Positioning of a fluid reservoir 45 below a portion of the tray floor 17 of a cowl tray in such a manner is a relatively space-efficient manner of packaging the components of the vehicle 11. Engagement of a reservoir basket 34 to an underside of a tray floor 17 of a cowl tray 16 advantageously strengthens the cowl tray 16 in vertical directions. The reservoir basket 34 of such a fluid-center understructure 33 may be constructed separately from the duct shell 29 thereof and then engaged directly or indirectly to the duct shell 29 thereof. Alternatively, the reservoir basket 34 of such a fluid-center understructure 33 may be integrally formed with the duct shell 29 thereof. In some such embodiments of the present invention the entire fluid-center understructure 33, including the duct shell 29 and the reservoir basket 34 thereof have an open-shape construction.

It will, of course, be understood that a vehicle 11 and a fluid center 12 mounted thereto according to the present invention could be of any of a number of different constructions within the guidelines set forth above and that some features of the invention could be employed without a corresponding use of other features.

We claim:

1. A vehicle, comprising:
   (a) one or more frame structures to which a large percentage of other components of said vehicle are engaged either directly or indirectly in such a manner that said frame structures function to maintain proper location of said other components of said vehicle relative to one another;
   (b) a suspension system that is engaged to said one or more frame structures and which supports said frame structures above the ground;
   (c) an driver cabin within which vehicle controls are located and within which a driver of said vehicle may reside while operating said vehicle;
   (d) wherein said cabin comprises a windshield through which a driver of said vehicle can view terrain ahead of said vehicle;
   (e) wherein said cabin further comprises cowl structure immediately below said windshield;

(f) an engine-compartment hood that extends in front of said cabin and which has an upper rear portion that is disposed forward of said cowl structure in spaced relation thereto;

(g) a fluid center that is mounted to a forward side of said cowl structure of said cabin;

(h) wherein said fluid center comprises a cowl tray which comprises a tray floor that extends horizontally beneath a gap between said upper rear portion of said engine compartment hood and said cowl structure of said cabin;

(i) wherein said cowl tray of said fluid center comprises a tray wall at least a portion of which extends vertically from a portion of said tray floor opposite said cowl structure of said cabin such that a catch basin is defined above said tray floor between said cowl structure and said tray wall;

(j) wherein said tray wall defines a drain hole through which liquid can exit said cowl tray;

(k) wherein said fluid center comprises a fluid reservoir that is engaged to said cowl structure only through other structure of said fluid center;

(l) said fluid reservoir is constructed of a different material than said cowl tray;

(m) said fluid center comprises reservoir-mounting structure that is integrally formed with said tray floor and said tray wall of said cowl tray and between opposing portions of which at least a portion of said fluid reservoir is captured in such a way to fixedly engage said fluid reservoir to said fluid center;

(n) said fluid reservoir is constructed of blow-molded nylon;

(o) said cowl tray and said reservoir-mounting structure are constructed of talc-filled polypropylene;

(p) said fluid center further comprises a fluid-center-mounted engine-air-intake duct that has an inlet and an outlet; and (q) wherein said vehicle further comprises other engine-air-intake ducts that are in fluid communication with said outlet of said fluid-center-mounted engine-air-intake duct.

2. The vehicle of claim 1, wherein:

(a) said inlet of said fluid-center-mounted engine-air-intake duct is in fluid communication with said catch basin or an area above said catch basin.

3. The vehicle of claim 2, wherein:

(a) said fluid-center-mounted engine-air-intake duct comprises a duct shell that is attached to other components of said fluid center in such a manner that at least a peripheral edge of said duct shell is abutted against outer portions of said tray wall and said tray floor in such a manner that said duct shell acts in concert with portions of said tray wall and said tray floor to define at least a portion of an interior passage of said fluid-center-mounted engine-air-intake duct between said duct shell and said outer portions of said tray wall and said tray floor; and (b) said duct shell has an open-shape construction.

4. The vehicle of claim 3, wherein:

(a) said fluid-center-mounted engine-intake-air duct comprises an intake projection with walls that surround an engine-intake-air opening in said tray floor and that extend into said catch basin to the outer ends of said walls that define said inlet of said fluid-center-mounted engine-air-intake duct.

5. The vehicle of claim 4, wherein:

(a) at least a portion of said fluid reservoir is constructed of a transparent or translucent material and is exposed for viewing by an individual to allow determination of a level of fluid within said fluid reservoir.

6. The vehicle of claim 1, wherein:

(a) said fluid center further comprises a fluid-center-mounted engine-air-intake duct with an inlet and an outlet; and (b) wherein said vehicle further comprises other engine-air-intake ducts that are in fluid communication with an outlet opening of said fluid-center-mounted engine-air-intake duct.

7. The vehicle of claim 6, wherein:

(a) said fluid-center-mounted engine-air-intake duct comprises a duct shell that is attached to other components of said fluid center in such a manner that at least a peripheral edge of said duct shell is abutted against outer potions of said tray floor in such a manner that said duct shell acts in concert with portions of said tray floor to define at least a portion of an interior passage of said fluid-center-mounted engine-air-intake duct between said duct shell and said outer portions of said tray floor; and (b) said duct shell has an open-shape construction.

8. The vehicle of claim 1, wherein:

(a) said fluid center further comprises a fluid-center-mounted engine-air-intake duct with an inlet and an outlet; and (b) wherein said vehicle further comprises other engine-air-intake ducts that are in fluid communication with an outlet opening of said fluid-center-mounted engine-air-intake duct.

9. The vehicle of claim 8, wherein:

(a) said fluid-center-mounted engine-air-intake duct comprises a duct shell that is attached to other components of said fluid center in such a manner that at least a peripheral edge of said duct shell is abutted against outer portions of said tray wall in such a manner that said duct shell acts in concert with portions of said tray wall define at least a portion of an interior passage of said fluid-center-mounted engine-air-intake duct between said duct shell and said outer portions of said tray wall; and (b) said duct shell has an open-shape construction.

10. A vehicle, comprising:

(a) one or more frame structures to which a large percentage of other components of said vehicle are engaged either directly or indirectly in such a manner that said frame structures function to maintain proper location of said other components of said vehicle relative to one another;

(b) a suspension system that is engaged to said one or more frame structures and which supports said frame structures above the ground;

(c) a driver cabin within which vehicle controls are located and within which an driver of said vehicle may reside while operating said vehicle;

(d) wherein said cabin comprises a windshield through which a driver of said vehicle can view terrain ahead of said vehicle;

(e) wherein said cabin further comprises cowl structure immediately below said windshield;

(f) an engine-compartment hood that extends in front of said cabin and which has an upper rear portion that is disposed forward of said cowl structure in spaced relation thereto;

(g) a fluid center that is mounted to a forward side of said cowl structure of said cabin;

(h) wherein said fluid center comprises a cowl tray which comprises a tray floor that extends horizontally beneath a gap between said upper rear portion of said engine compartment hood and said cowl structure of said cabin;

(i) wherein said cowl tray of said fluid center comprises a tray wall at least a portion of which extends vertically from a portion of said tray floor opposite said cowl structure of said cabin such that a catch basin is defined above said tray floor between said cowl structure and said tray wall;

(j) wherein said tray floor defines a drain hole through which liquid can exit said cowl tray;

(k) said fluid center comprises a fluid-center-mounted engine-air-intake duct that has an inlet and an outlet; and (l) wherein said vehicle further comprises other engine-air-intake ducts that are in fluid communication with an outlet of said fluid-center-mounted engine-air-intake duct.

11. The vehicle of claim 10, wherein:

(a) said fluid-center-mounted engine-air-intake duct comprises a duct shall that is attached to other components of said fluid center in such a manner that at least a peripheral edge of said duct shell is abutted against outer portions of said tray wall or said tray floor in such a manner that said duct shell acts in concert with portions of said tray wall or said tray floor to define at least a portion of an interior passage of said fluid-center-mounted engine-air-intake duct between said duct shell and said outer portions of said tray wall or said tray floor; and (b) said duct shell has an open-shape construction.

12. The vehicle of claim 11, wherein:

(a) said duct shell comprises a duct floor that extends horizontally in spaced relationship below said tray floor which functions as a duct ceiling of said fluid-center-mounted engine-air-intake duct; and (b) wherein said duct shell further comprises duct walls that are integrally formed with said duct floor and that extend vertically upward therefrom to an underside of said tray floor.

13. The vehicle of claim 11, wherein:

(a) said inlet of said fluid-center-mounted engine-air-intake duct is in fluid communication with said catch basin or an area above said catch basin.

14. The vehicle of claim 13, wherein:

(a) said fluid-center-mounted engine-intake-air duct comprises an intake projection with walls that surround an engine-intake-air opening in said tray floor and that extend into said catch basin to outer ends of said walls that define said inlet of said fluid-center-mounted engine-air-intake duct.

15. The vehicle of claim 14, wherein:

(a) said duct shell comprises a duct floor that extends horizontally in spaced relationship below said tray floor which functions as a duct ceiling of said fluid-center-mounted engine-air-intake duct; and (b) wherein said duct shell further comprises duct walls that are integrally formed with said duct floor and that extend vertically upwardly therefrom to an underside of said tray floor.

16. The vehicle of claim 15, wherein:

(a) said duct shell is part of a fluid-center understructure that has an open-shaped construction and that is integrally formed;

(b) said fluid-center understructure further comprises a reservoir basket that comprises a basket floor that is disposed below said tray floor;

(c) said fluid-center understructure further comprises one or more basket suspenders that are integrally formed with said basket floor and that extend vertically upward therefrom and are attached to said floor or said tray wall; and (d) said fluid center comprises a fluid reservoir that rests upon said basket floor between said basket suspenders.

17. The vehicle of claim 16, wherein:

(a) at least a portion of said fluid reservoir is constructed of a material that is translucent or transparent and is exposed such that an individual may determine a level of fluid within said fluid reservoir by looking through said material that is translucent or transparent.

18. The vehicle of claim 15, wherein:

(a) said duct shell is part of a fluid-center understructure that has an open-shape construction and that is integrally formed;

(b) said fluid-center understructure further comprises a reservoir basket that comprises a basket floor that is disposed below said tray floor;

(c) said fluid-center understructure comprises one or more basket suspenders that are integrally formed with said basket floor and that extend vertically upward therefrom and are attached to said floor or said tray wall; and (d) said fluid center further comprises a fluid reservoir that rests upon said basket floor between said basket suspenders.

* * * * *